March 30, 1954  C. C. DE WITT  2,673,646

FRUIT SIZER

Filed Feb. 6, 1953

INVENTOR.
CHARLES CLIFFORD DE WITT
BY Chas. Krasson
ATTORNEY

Patented Mar. 30, 1954

2,673,646

UNITED STATES PATENT OFFICE 2,673,646

FRUIT SIZER

Charles Clifford De Witt, Fruitland, Ontario, Canada

Application February 6, 1953, Serial No. 335,565

2 Claims. (Cl. 209—87)

This invention relates generally to machines used in grading fruit for size, and particularly for the grading of such fruits as apples, pears, peaches, oranges, grapefruit, etc.

Several varieties of fruit sizers are being sold at the present time for use by fruit growers for the purpose of separating various fruits into different size groups. Some of these employ the method of discharging fruit at various positions on a pair of converging conveyors, others grade the fruit by passing it through angular rotating wheels and screens of varying mesh.

Because most fruits are not perfectly spherical nor symmetrical in shape, practically all of the above-mentioned machines are designed to handle either one type of fruit only or several types of fruit after considerable adjustment between each type of fruit handled. In many cases the removal or the addition of new parts are required with the change from one fruit to another.

It is obvious from the above that such machines are costly to manufacture and maintain, and much time is lost in converting such machines for use from one fruit to another. Furthermore, the high cost of manufacture makes such fruit graders almost beyond reach of the small fruit grower.

It is the primary object of this invention to provide a fruit grader which is automatic in action, can handle several varieties of fruit without the necessity of elaborate adjustment when fruits are changed from one type to another, and can deliver such fruit properly sized to the packaging facilities undamaged.

Another object of the invention is to provide a machine such as described above having only a few simple parts thus reducing the cost of manufacture of the said machine and its cost of maintenance during operation.

In describing the invention reference will be made to the attached drawing in which.

Figure 1:
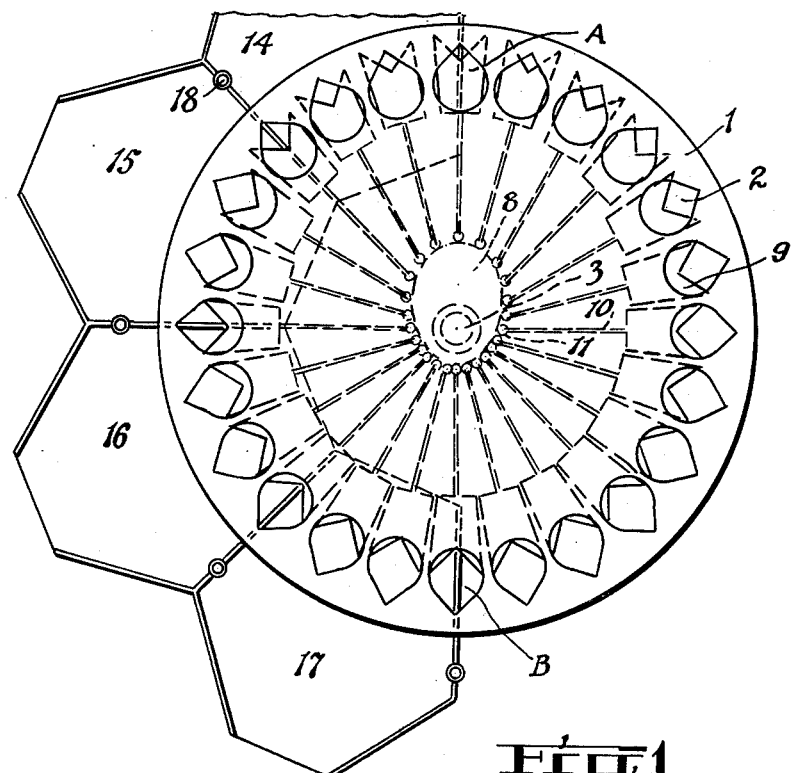
Figure 1 is a plan of the invention.
Figure 2:
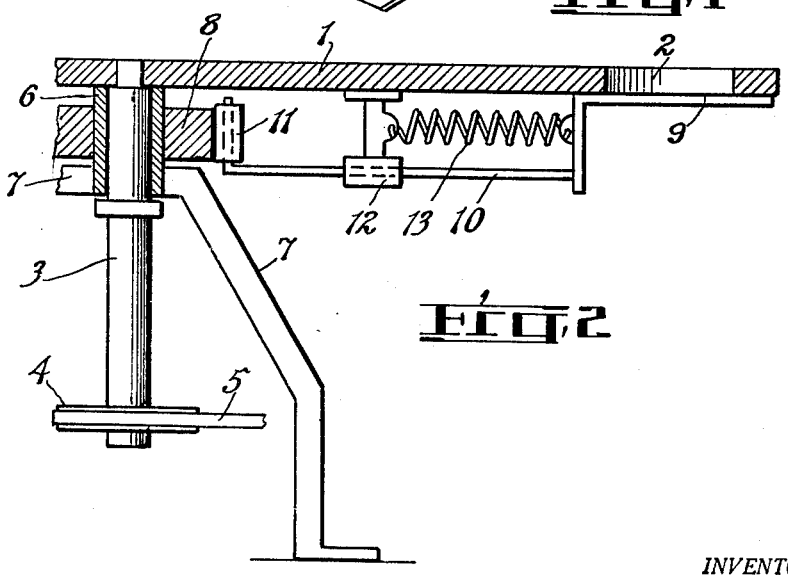
Figure 2 is an elevation of the invention shown partly in section.

The invention as illustrated in the drawings consists of a circular plate 1 made of metal or wood and of a thickness suitable for the purpose it is to function as described further on in the specification. This circular plate is provided with a plurality of radially disposed holes 2 in the vicinity of its circumference. The holes 2 are made large enough to contain the largest possible of the type of fruit to be sized by the machine. These holes are partly circular in shape and terminate in a point of a right angle which is tangent to the said circular part. The circular part of the holes 2 point in the direction of the center of the circular plate 1, while the pointed parts of the holes point towards the circumference of the said plate. The depth of the holes 2 is actually the thickness of the plate 1, and is such that any single fruit falling into the holes 2 will not roll out of these holes until properly discharged.

The circular plate 1 is rigidly attached to a central shaft 3 which is rotated by means of a pulley 4 and a belt 5 which leads to a motor or any other source of power, not shown in the drawings. Thus the rotation of the shaft 3, rotates the plate 1. The plate 1 can be rotated at any suitable speed, although early experiments have shown that a speed of 6 to 8 R. P. M. to be most practical. Of course, the diameter of the plate 1 would be a determining factor in the final speed of the machine.

The shaft 3 rotates in a bearing 6 which is stationary having attached thereto the legs 7 upon which the machine stands and by means of which it may be fixed to the floor. To the bearing 6 is rigidly attached a cam 8. This cam is shown in the drawings somewhat elliptical in shape, however, it can be made into any shape to conform with existing requirements.

Under the plate 1, each of the holes 2 is provided with a movable base comprising a V notched sliding plate 9 to which is rigidly attached a bent bar 10 which terminates at the other end in a vertical bend upon which rotates freely a roller 11. This roller 11 rotates upon the cam 8 as the plate 1 is rotated by its shaft 3. The movable bases are rigidly attached to the underside of the plate 1 by means of an elongated sleeve 12 in which the bar 10 is free to slide. A suitable spring 13 is held in tension between the plate 9 and the support for the sleeve 12, so that the rollers 11 are at all times pressed against the cam 8. Thus, at the point of the cam 8 where it is the furthest away from the center of the plate 1, the sliding plate 9 will also be in the furthest position from the said center, as shown at the location A, similarly, at the point where the outer rim of the cam 8 is closest to the center of the plate 1, the sliding plate 9 will also be the closest to the said center, as shown at location B. All other sliding plates 9 belonging to the holes 2 located between the points A and B will assume various positions depending upon their contact with the rim of the cam 8.

The notch in the sliding plate 9 is also rectangular so that the opening formed between the notch in the said plate 9 and the rectangular part of the hole 2 always form a square opening. This opening is of the smallest size when the sliding plate 9 is the furthest from the center of the plate 1 as shown at A, and is of the largest size when the sliding plate 9 is nearest to the center of the said plate. The shape of the cam 8 is made so that the square holes thus formed in all the holes 2 between A and B gradually increase in size from A to B on the left side of the plate 1, and gradually decrease in size from B to A, on the right of the plate.

In operation, the sizer is used in the following manner: The plate 1 is in this case rotated in a counterclockwise direction and the fruit is supplied at the point A manually or by means of a conveyor at a rate of speed which would feed one fruit to each hole 2. Small sized fruits would fall through the small openings immediately after point A while larger sized fruits would be retained in the said holes and discharged at various points as the holes 2 approached the point B. Only one type of fruit is passed through the sizer at one time, and the opening at B is such that the largest possible size of that type of fruit would pass through it. Thus, the holes 2 approaching A from B would be returning empty to receive new fruit at point A.

Under the grading side of the plate 1 is provided a plurality of abutting bins 14, 15, 16, and 17, which collect the fruit and deliver them by gravity or other means to whatever packaging is used. The walls separating these bins are pivoted at 18 so that they can be located in any position relative to the rotating holes 2. In this manner, the bin 14 will contain the smallest sized fruits, the bin 15 will collect fruits next in size to that in bin 14, the bin 16 will contain fruits the next size larger to those in bin 15, while the bin 17 will contain the largest size common to that type of fruit.

In actual construction of the sizer, the plate 1 is made large enough to contain a large number of the holes 2 so that a very gradual increase in the size of the opening takes place from hole to hole, thus a large variety of the more common types of fruits can be handled in one machine without the necessity of adjustment. Experiments have shown that a variety of fruit such as apples, pears, peaches, and plums, can be handled consecutively by this invention by properly determining the fixed size of the holes 2, and the operation of the machine was not affected by the variation in the shape and size characteristic to each of the said fruits, since the passage of the fruit through the square openings in the holes 2 took place immediately the maximum dimension of the said square opening became equal to the maximum diameter of the contained fruit.

A very simplified form of the invention has been shown in the drawings and described in the specification. This constitutes one of the essential values of this invention, since in the actual construction of the machine very little can be added to improve its operation.

Having described my invention, what I claim is:

1. A fruit sizer comprising a revolving horizontal circular plate with a plurality of equally spaced, radially disposed holes at its circumference, each of said holes being partly circular and terminating in a tangential right angular point, and each of said holes being further provided on its underside with a right angularly notched movable base plate, the notch of the said base plate forming a variable sized square opening in the said hole; a plurality of spring loaded movable right angularly notched base plates, one for each of said holes, said base plates being rigidly attached to the under side of the said horizontal plate but free to move radially to and from the center of the said plate upon a stem attached thereto, said stem terminating in a roller which makes contact with a fixed cam, a spring attached to the said base plate to keep the said roller constantly pressed against the said cam; a shaft centrally and rigidly attached to the said horizontal plate; a fixed bearing for rotatably supporting the said shaft in a vertical position; a cam rigidly fixed to the outside of the said bearing, said cam having an outer peripheral shape to provide a gradual increase in the size of the square opening in the radially spaced holes, upon the rotation of the said horizontal circular plate; a plurality of legs rigidly attached to the said bearing for supporting the sizer; and power means for providing rotation to the said shaft and circular plate.

2. A fruit sizer such as described in claim 1 provided with a plurality of collecting bins having a common bottom and pivoted dividing walls for width adjustment of the bin compartments.

CHARLES CLIFFORD DE WITT.

References Cited in the file of this patent

UNITED STATES PATENTS

| Number | Name | Date |
|---|---|---|
| 458,061 | McClendon | Aug. 18, 1891 |
| 508,911 | Billingsley | Nov. 21, 1893 |
| 2,522,917 | Zondagh | Sept. 19, 1950 |